(12) United States Patent
Shiono (10) Patent No.: US 10,840,828 B2
(45) Date of Patent: Nov. 17, 2020

(54) MOTOR AND ELECTRONIC APPARATUS INCLUDING MOTOR

(71) Applicant: CANON KABUSHIKI KAISHA, Tokyo (JP)

(72) Inventor: Masato Shiono, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 767 days.

(21) Appl. No.: 15/496,780

(22) Filed: Apr. 25, 2017

(65) Prior Publication Data

US 2017/0317614 A1 Nov. 2, 2017

(30) Foreign Application Priority Data

Apr. 28, 2016 (JP) .................................. 2016-090705

(51) Int. Cl.
*H01L 41/09* (2006.01)
*H02N 2/02* (2006.01)
(Continued)

(52) U.S. Cl.
CPC ............. *H02N 2/026* (2013.01); *H02N 2/006* (2013.01); *H02N 2/0055* (2013.01); *H02N 2/04* (2013.01)

(58) Field of Classification Search
CPC ...... H02N 2/026; H02N 2/0055; H02N 2/006; H02N 2/04
(Continued)

(56) References Cited

U.S. PATENT DOCUMENTS

| 5,446,331 A | 8/1995 | Watanabe et al. |
|---|---|---|
| 7,129,620 B2 | 10/2006 | Sakano et al. |

(Continued)

FOREIGN PATENT DOCUMENTS

| CN | 1697300 A | 11/2005 |
|---|---|---|
| CN | 101567644 A | 10/2009 |

(Continued)

OTHER PUBLICATIONS

The above foreign patent documents were cited in a Jan. 2, 2019 Chinese Office Action, which is enclosed with an English Translation, that issued in Chinese Patent Application No. 201710293705.0.

(Continued)

*Primary Examiner* — Thomas M Dougherty
(74) *Attorney, Agent, or Firm* — Cowan, Liebowitz & Latman, P.C.

(57) ABSTRACT

A motor includes a vibrator, a plurality of pressing members that presses the vibrator onto a contacting member in contact with the vibrator, a transmission member that transmits pressing force, which is applied by the plurality of pressing members, to the vibrator, a first holding member that holds the vibrator, a second holding member that holds the transmission member, and a coupling member that couples the first holding member to the second holding member. The vibrator and the contacting member move relatively by vibrations that occur in the vibrator. The vibrator includes a protruding part that is provided on a surface opposite to a surface on a transmission member side. The pressing members are arranged separately to surround the protruding part. The coupling member is arranged at a position closer to the protruding part than the pressing members.

19 Claims, 4 Drawing Sheets

(51) Int. Cl.
H02N 2/00 (2006.01)
H02N 2/04 (2006.01)

(58) Field of Classification Search
USPC .......................................... 310/311–371, 800
See application file for complete search history.

(56) References Cited

U.S. PATENT DOCUMENTS

| | | |
|---|---|---|
| 2008/0174206 A1 | 7/2008 | Sakamoto |
| 2013/0193803 A1 | 8/2013 | Yamasaki |
| 2014/0078219 A1 | 3/2014 | Nishimura |
| 2014/0285066 A1 | 9/2014 | Yamamoto |
| 2014/0293463 A1 | 10/2014 | Yamanaka et al. |
| 2015/0183001 A1 | 7/2015 | Yamamoto |
| 2016/0065092 A1 | 3/2016 | Yamanaka et al. |
| 2016/0103296 A1 | 4/2016 | Yamanaka |
| 2016/0352256 A1* | 12/2016 | Yamasaki ............... H02N 2/026 |
| 2017/0038554 A1* | 2/2017 | Nakashita ............... H02N 2/026 |

FOREIGN PATENT DOCUMENTS

| | | | |
|---|---|---|---|
| CN | 102244191 A | 11/2011 | |
| CN | 104065298 A | 9/2014 | |
| CN | 104104265 A | 10/2014 | |
| CN | 104753390 A | 7/2015 | |
| EP | 2889997 A1 | 7/2015 | |
| JP | 11-346486 A | 12/1999 | |
| JP | 2005-312264 A | 11/2005 | |
| JP | 2015-126692 A | 7/2015 | |
| JP | 2016226161 A * | 12/2016 | ............ H02N 2/026 |
| RU | 2596177 C2 | 8/2016 | |
| TW | 201334391 A | 8/2013 | |

OTHER PUBLICATIONS

The above patent documents were cited in the Nov. 29, 2017 Singapore Office Action, which is enclosed, that issued in Singaporean Patent Application No. 10201703315T.

The above references were cited in a Dec. 6, 2017 Taiwanese Office Action, which is enclosed with an English Translation, that issued in the counterpart Taiwan Patent Application No. 106111750.

The above patent documents were cited in a Aug. 21, 2018 Russian Search Report, which is enclosed with an English Translation, that issued in Russian Patent Application No. 2017113514.

The above documents were cited in a European Search Report dated Oct. 2, 2017, which is enclosed, that issued in the corresponding European Patent Application No. 17168104.2.

The above patent documents were cited in a Oct. 22, 2019 Korean Office Action, which is enclosed with an English Translation, that issued in Chinese Patent Application No. 10-2017-0050752.

The above document was cited in a Nov. 28, 2019 Chinese Office Action, which is enclosed with an English Translation, that issued in Chinese Patent Application No. 201910354438.2.

The above foreign patent document was cited in a Sep. 22, 2020, Philippine Substantive Examination Report, that issued in Philippine Patent Application No. 12017000138.

* cited by examiner

MOTOR AND ELECTRONIC APPARATUS INCLUDING MOTOR

BACKGROUND OF THE INVENTION

Field of the Invention

The present invention relates to a motor including a vibrator.

Description of the Related Art

There is known a vibration-wave motor (ultrasonic motor) configured to drive a sliding member relatively by pressing a vibrator, which vibrates periodically when a high frequency voltage is applied, onto the sliding member. An ultrasonic motor disclosed in Japanese Patent Laid-Open No. 2015-126692 includes a vibrator, a friction member, a pressing mechanism to press the vibrator onto the friction member, and a mechanism provided to be movable in a pressing direction without any backlash in a driving direction between a base to fix the vibrator and a vibrator supporting member to hold the base. Thus, the ultrasonic motor disclosed in Japanese Patent Laid-Open No. 2015-126692 can hold the vibrator without any backlash in the driving direction and can improve feeding precision of the vibration supporting member.

However, in Japanese Patent Laid-Open no. 2015-126692, the pressing mechanism to press the vibrator onto the friction member is stacked in the pressing direction, whereby the ultrasonic motor enlarges in a thickness direction. The mechanism provided to be movable in the pressing direction without any backlash in the driving direction also enlarges in the driving direction. As a result, it is difficult to miniaturize the ultrasonic motor unit while providing the pressing mechanism and the mechanism provided to be movable in the pressing direction without any backlash in the driving direction.

SUMMARY OF THE INVENTION

In view of the problem, an object of the present invention is to provide a motor capable of being miniaturized while providing a pressing mechanism that presses a vibrator onto a contacting member and a mechanism that is provided to be movable in a pressing direction without any backlash in a driving direction.

A motor according to one aspect of the present invention includes a vibrator, a plurality of pressing members that presses the vibrator onto a contacting member in contact with the vibrator, a transmission member that transmits pressing force, which is applied by the plurality of pressing members, to the vibrator, a first holding member that holds the vibrator, a second holding member that holds the transmission member, and a coupling member that couples the first holding member to the second holding member. The vibrator and the contacting member move relatively by vibrations that occur in the vibrator. The vibrator includes a protruding part that is provided on a surface opposite to a surface on a transmission member side. The plurality of pressing members is arranged separately to surround the protruding part. The coupling member is arranged at a position closer to the protruding part than the plurality of pressing members.

A motor according to another aspect of the present invention enables a vibrator and a contacting member in contact with the vibrator to move relatively by vibrating the vibrator. The motor includes a pressing mechanism that includes a plurality of elastic members and a transmission member transmitting force by the plurality of elastic members to the vibrator, and that presses the vibrator onto the contacting member, a first member that holds the vibrator, a second member that holds the pressing mechanism, and a coupling member that couples the first holding member to the second holding member. The coupling member includes a rolling member that enables the first and second members to relatively move in a pressing direction of the pressing mechanism. The plurality of elastic members is arranged around the vibrator in a plane orthogonal to the pressing direction. The rolling member is arranged at a position closer to the vibrator than the plurality of elastic members in at least one direction of a relative movement direction of the vibrator and the contacting member or a direction orthogonal to both of the pressing direction and the relative movement direction.

An electronic apparatus according to another aspect of the present invention includes a motor. The motor includes a vibrator, a plurality of pressing members that presses the vibrator onto a contacting member in contact with the vibrator, a transmission member that transmits pressing force, which is applied by the plurality of pressing members, to the vibrator, a first holding member that holds the vibrator, a second holding member that holds the transmission member, and a coupling member that couples the first holding member to the second holding member. The vibrator and the contacting member move relatively by vibrations that occur in the vibrator. The vibrator includes a protruding part that is provided on a surface opposite to a surface on a transmission member side. The plurality of pressing members is arranged separately to surround the protruding part. The coupling member is arranged at a position closer to the protruding part than the plurality of pressing members.

An electronic apparatus according to another aspect of the present invention includes a motor that enables a vibrator and a contacting member in contact with the vibrator to move relatively by vibrating the vibrator. The motor includes a pressing mechanism that includes a plurality of elastic members and a transmission member transmitting force by the plurality of elastic members to the vibrator, and that presses the vibrator onto the contacting member, a first member that holds the vibrator, a second member that holds the pressing mechanism, and a coupling member that couples the first holding member to the second holding member. The coupling member includes a rolling member that enables the first and second members to relatively move in a pressing direction of the pressing mechanism. The plurality of elastic members is arranged around the vibrator in a plane orthogonal to the pressing direction. The rolling member is arranged at a position closer to the vibrator than the plurality of elastic members in at least one direction of a relative movement direction of the vibrator and the contacting member or a direction orthogonal to both of the pressing direction and the relative movement direction.

Further features of the present invention will become apparent from the following description of exemplary embodiments with reference to the attached drawings.

DESCRIPTION OF THE PREFERRED EMBODIMENTS

Referring now to the accompanying drawings, a detailed description will be given of embodiments of the present invention. Those elements in each figure, which are corresponding elements, will be designated by the same reference numerals, and a description thereof will be omitted.

Figure 1:
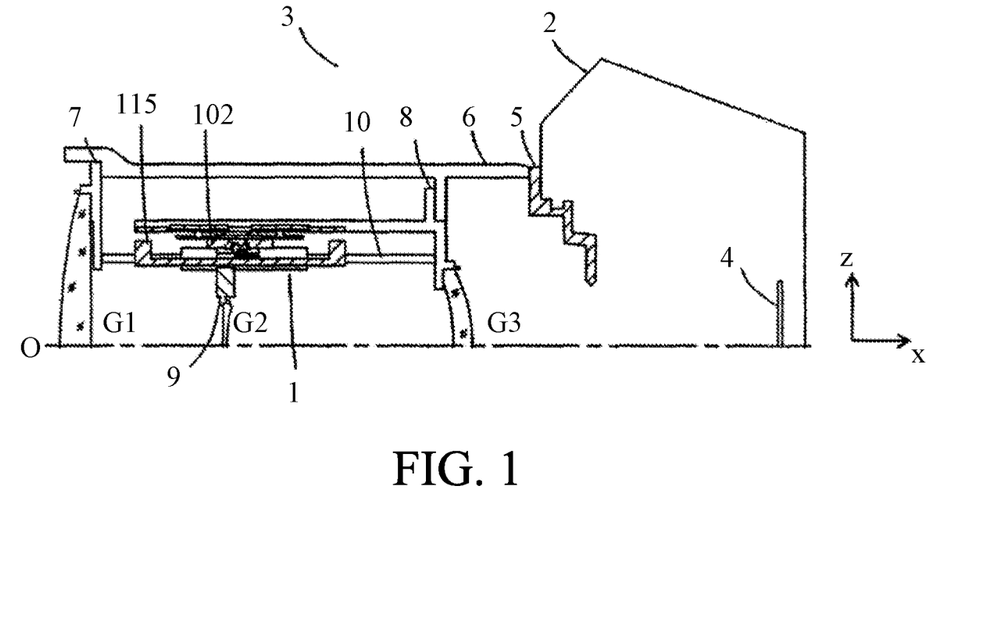
FIG. 1 is a sectional view of main components of an electronic apparatus including an ultrasonic motor according to an embodiment of the present invention.
Figure 2:
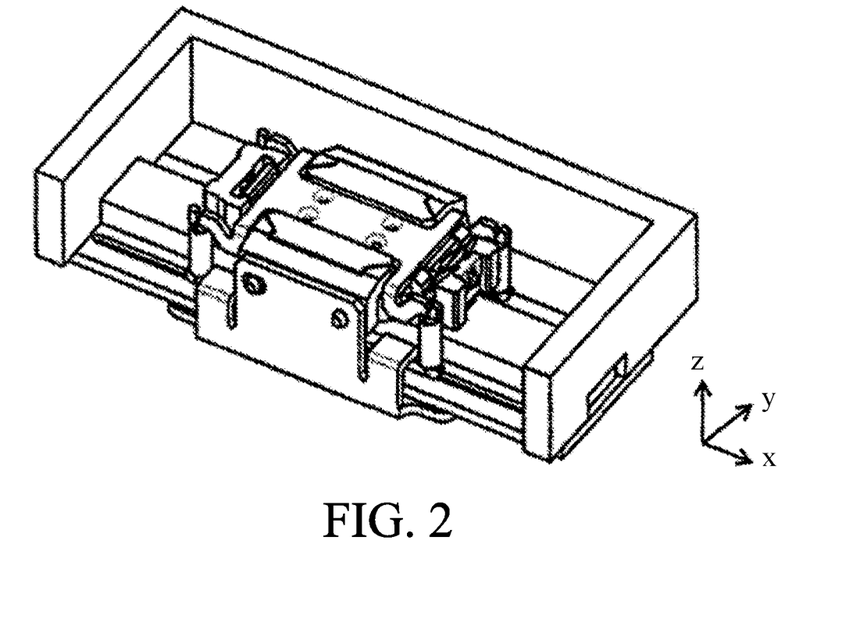
FIG. 2 is a perspective view of an ultrasonic motor according to a first embodiment.
Figure 3:
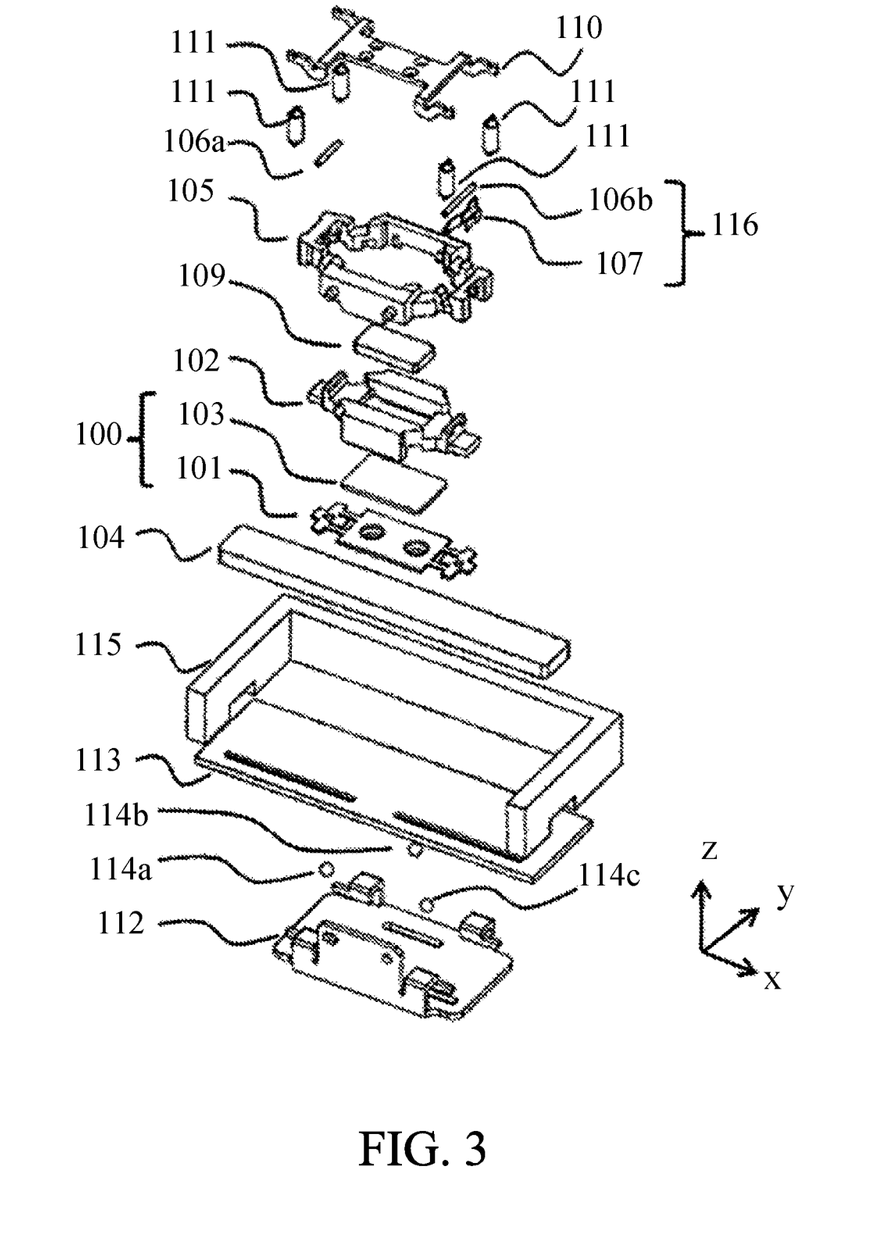
FIG. 3 is an exploded perspective view of the ultrasonic motor according to the first embodiment.
Figure 4:
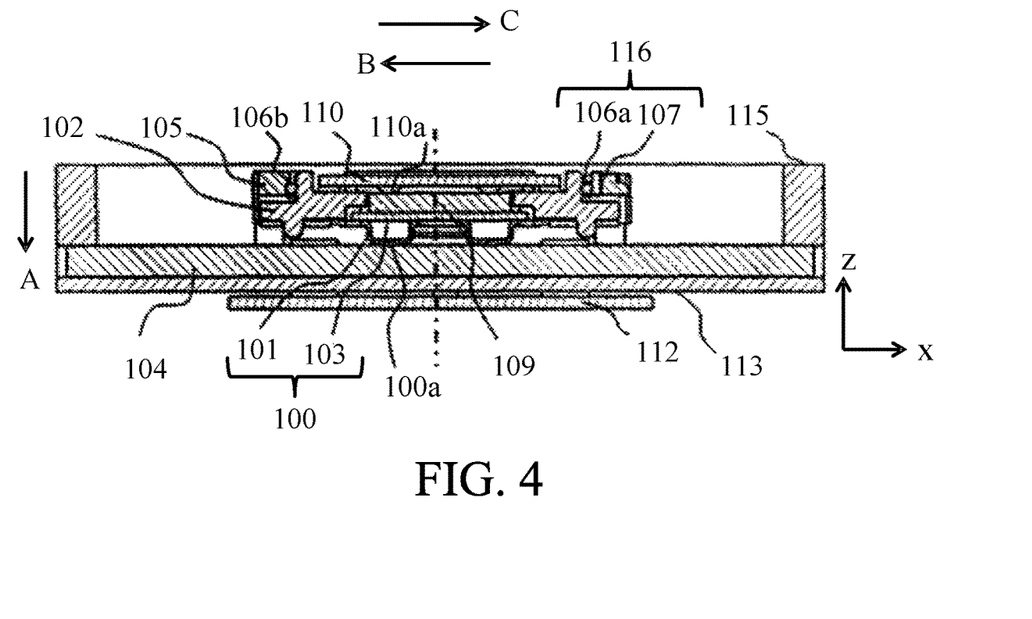
FIG. 4 is a sectional view of main components of the ultrasonic motor according to the first embodiment.

FIG. 1 is a sectional view of main components of a lens barrel as one example of an electronic apparatus including an ultrasonic motor 1 that is a vibration-wave motor according to an embodiment of the present invention. Since the lens barrel is approximately rotationally symmetrical, only an upper half thereof is illustrated in FIG. 1. Moreover, FIG. 1 illustrates the lens barrel detachably attached to an image pickup apparatus as one example of the electronic apparatus including the ultrasonic motor 1 that is the vibration-wave motor according to the embodiment of the present invention, but an image pickup apparatus integrated with a lens barrel is considered as another example of the electronic apparatus.

A lens barrel 3 is detachably attached to a camera body (image pickup apparatus) 2 through a mount 5, and an image pickup element 4 is provided inside the camera body 2. To a fixing barrel 6 of the lens barrel 3, a front lens barrel 7, which holds a lens G1, and a rear lens barrel 8, which holds a lens G3, are fixed. A lens holding frame 9 holds a lens G2, and is held straight movably by a guide bar 10, which is held by the front lens barrel 7 and the rear lens barrel 8. On a base plate 115 of the ultrasonic motor 1, a flange part (not illustrated) to be fixed to the rear lens barrel 8 with screws is formed.

When a moving part including a vibrator holding member 102 of the ultrasonic motor 1 is driven, driving force of the ultrasonic motor 1 is transmitted to the lens holding frame 9 through the vibrator holding member 102, and thus the lens holding frame 9 moves linearly in parallel with an optical axis O (x-axis) by the guide bar 10.

In this embodiment, the ultrasonic motor 1 is mounted on the lens barrel 3, which is the electronic apparatus, but the present invention is not limited to this. The ultrasonic motor 1 may be mounted on the electronic apparatus different from the lens barrel and the image pickup apparatus. Additionally, the ultrasonic motor 1 is used to move the lens in parallel with the optical axis O, but may be used to move a blur correction lens in a direction orthogonal to the optical axis O.

First Embodiment

FIGS. 2 to 5 are respectively a perspective view, an exploded perspective view, a sectional view of main components, and a top view of the ultrasonic motor 1 according to this embodiment.

A friction member (contacting member) 104 and a guide supporting member 113 are fixed to the base plate 115 with screws. Four pressing springs (pressing members) 111 are each coupled to a pressing force transmission member (transmission member) 110 and a driving force transmission member 112 through coupling holding parts that the pressing force transmission member 110 and the driving force transmission member 112 each include. Tension spring force is generated between the pressing force transmission member 110 and the driving force transmission member 112, and draws the pressing force transmission member 110 in a direction shown as an arrow A. Thus, a pressing mechanism to press a vibrator 100 onto the friction member 104 includes the pressing springs 111, the pressing force transmission member 110, and the driving force transmission member 112. The pressing force transmission member 110 includes a pressing part 110a formed as an approximately hemispherical protruding part, and, to prevent damage to a piezoelectric element 103, an elastic member 109 is arranged between the piezoelectric element 103 and the pressing part 110a so that they do not directly contact with each other. The pressing springs 111 presses the vibrator 100 in the direction shown as the arrow A through these members. When the pressing springs 111 presses the vibrator 100, a pressure contact part 100a, which is a protruding part formed on a surface opposite to a surface on a pressing force transmission member 110 side of the vibrator 100, comes into frictional contact with the friction member 104. In this embodiment, the pressing springs 111 press the vibrator 100 at four positions, but the present invention is not limited to this as long as a plurality of pressing members can press the vibrator 100 at different positions. Furthermore, in this embodiment, the springs are used as the pressing members, but the present invention is not limited to this as long as the vibrator 100 can be pressed onto the friction member 104.

The vibrator 100 includes a vibration plate 101, and the piezoelectric element 103 adhered to the vibration plate 101 by an adhesive. The vibration plate 101 is fixed to the vibrator holding member 102 using a welding or an adhesive. The piezoelectric element 103 excites ultrasonic vibration by being applied with a high frequency voltage. when the piezoelectric element 103, which is adhered to the vibration plate 101, excites the ultrasonic vibration, a resonance phenomenon occurs on the vibrator 100. That is, the vibrator 100 generates the ultrasonic vibration by being applied with the high frequency voltage. As a result, at an end of the pressure contact part 100a formed on the vibrator 100, approximately elliptical vibration occurs.

Changing a frequency and a phase of the high frequency voltage applied to the piezoelectric element 103 can vary a rotational direction and an elliptical ratio appropriately, and thus a desired vibration can be generated. Accordingly, pressing the vibrator 100 onto the friction member 104 generates the driving force for relatively moving them, and thus the vibrator 100 can move along the x-axis (optical axis O) with respect to the friction member 104. A relative movement direction of the vibrator 100 is orthogonal to a pressing direction of the pressing springs 111 presses.

A coupling member 116, which includes rollers (rolling members) 106a, 106b and a plate spring (urging member) 107 having predetermined elasticity, is incorporated between the vibrator holding member 102 and a holding housing 105 to hold the pressing force transmission member 110. The roller 106a is sandwiched between the plate spring 107 and the vibrator holding member 102 to be movable in the direction shown as the arrow A (pressing direction of the pressing springs 111). The plate spring 107 is arranged between the holding housing 105 and the roller 106a, and has urging force parallel to the x-axis. That is, the plate spring 107 urges the vibrator holding member 102 in a direction shown as an arrow B through the roller 106a, and urges the holding housing 105 in a direction shown as an arrow C. Whereby, the roller 106b is sandwiched between the vibrator holding member 102 and the holding housing 105.

With such a structure, the coupling member 116 causes no backlash in the direction parallel to the x-axis (movement direction of the vibrator 100), and suppresses sliding resistance in the direction shown as the arrow A (pressing direction of the pressing springs 111) by action of the rollers 106a and 106b.

In addition, the urging force of the plate spring 107 is set to be larger than inertial force by acceleration and deceleration generated in starting and stopping drive of the holding housing 105 and a driven part. Whereby, a relative displacement along the movement direction of the vibrator 100 by the inertial force during driving is not generated among the vibrator 100, the vibrator holding member 102 and the holding housing 105, and thus stable driving control can be realized.

In this embodiment, the rollers 106a and 106b are used as the rolling member included in the coupling member 116, but the present invention is not limited to this as long as the coupling member 116 is enabled to move in the direction shown as the arrow A. For example, bolls may be used instead of the rollers. Moreover, in this example, the plate spring 107 is used as the urging member included in the coupling member 116, but the present invention is not limited to this as long as no backlash between the vibrator holding member 102 and the holding housing 105 is generated.

The driving force transmission member 112 is fixed to the holding housing 105 by an adhesive or screwing, and transmits the driving force generated in the vibrator 100. On the driving force transmission member 112, three V-grooves (moving side guiding parts), where rolling balls (guide members) 114a to 114c are inserted, are formed to guide the holding housing 105 along the x-axis (optical axis O). The guide supporting member 113 is arranged under the friction member 104. The friction member 104 and the guide supporting member 113 are fixed to the base plate 115 with screws. On the guide supporting member 113, three groove-shaped fixed side guiding parts are formed. The rolling balls 114a to 114c are each sandwiched between the moving side guiding part formed on the driving force transmission member 112 and the fixed side guiding part formed on the guide supporting member 113. By these members, the holding housing 105 is supported to be movable forward or backward along the x-axis (optical axis O). In this embodiment, of three fixed side guiding parts formed on the guide supporting member 113, two are V-grooves and one is a plane groove having a bottom, but they may be grooves capable of rolling the rolling balls 114.

In this embodiment, to thin the ultrasonic motor 1 in the z-axis direction, the pressing springs 111 are arranged separately to surround the vibrator 100 instead of being stacked on an upper part of the vibrator 100. In this embodiment, generating the pressing force by the plurality of pressing springs 111 can miniaturize the pressing springs 111. Additionally, the vibrator 100 is preferable pressed onto the friction member 104 uniformly. In this embodiment, as illustrated in FIG. 5, the pressing springs 111 are arranged separately to surround the pressure contact part 100a of the vibrator 100 when the ultrasonic motor 1 is viewed from top with respect to an X-Y plane.

The coupling member (the rollers 106a, 106b and the plate spring 107) 116 is arranged between the pressing springs 111 (at a position closer to the pressure contact part 100a than the pressing springs 111) in the direction parallel to the x-axis (movement direction of the vibrator 100) and in the direction parallel to the y-axis. That is, the pressing springs 111 are arranged outside the coupling member 116 around the vibrator 100 in the directions parallel to the x-axis and y-axis. The direction parallel to the y-axis is the direction orthogonal to both of the movement direction of the vibrator 100 and the pressing direction of the pressing springs 111. However, the direction parallel to the y-axis need not be strictly orthogonal to the above directions, and is regarded as substantially orthogonal to the above directions even when shifting by a few degrees.

Figure 5:
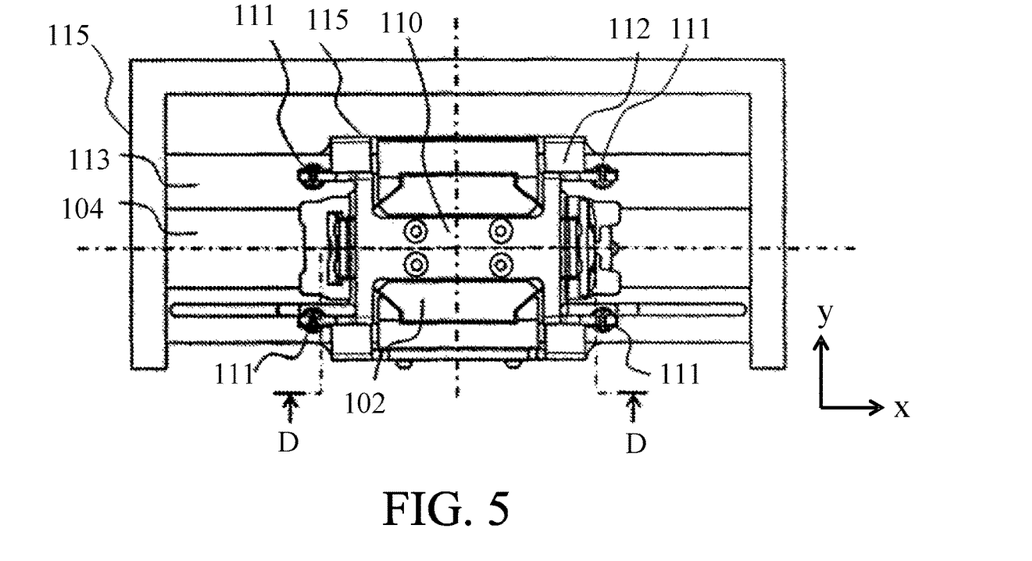
FIG. 5 is a top view of the ultrasonic motor according to the first embodiment.
Figure 6:
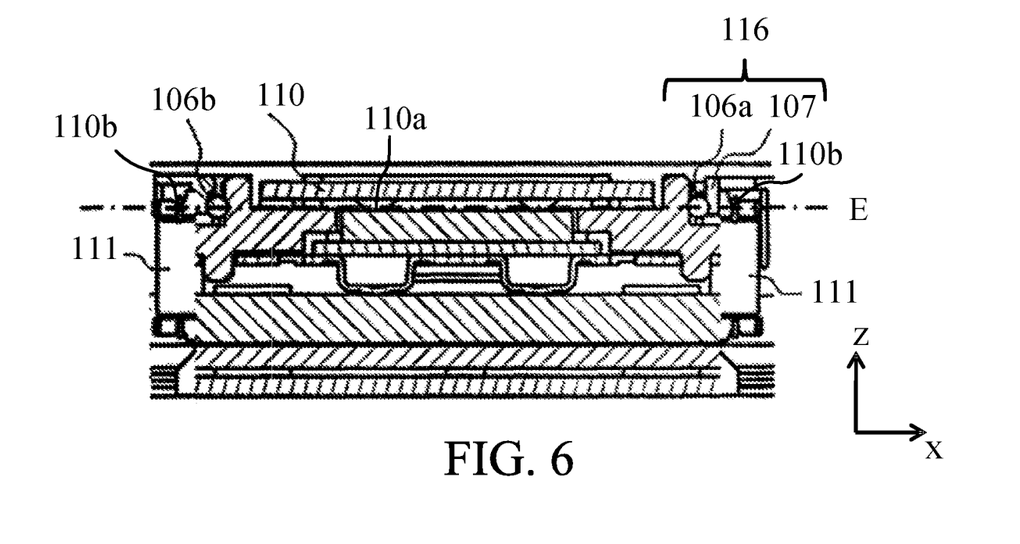
FIG. 6 is a sectional view taken along D-D of FIG. 5.

FIG. 6 is a sectional view taken along D-D of FIG. 5. In the direction parallel to the z-axis, the coupling holding parts 110b of the pressing force transmission member 110 that couples and holds the pressing springs 111, the pressing part 110a of the pressing force transmission member 110, and the coupling member 116 are arranged at the same position on the dashed line E in the figure. They need not be strictly arranged at the same position, and are deemed to be arranged at substantially the same position even when shifting by a few mm. In the direction where the vibrator 100 is pressed (direction shown as the arrow A), providing these members on the dashed line E has no bad influence due to pressurization on the rollers 106a, 106b and the plate spring 107 included in the coupling member 116. Thus, a tilt in the movement direction of the vibrator 100 is suppressed, whereby stability of driving performance can be realized.

With such a structure, the ultrasonic motor 1 according to this embodiment can be miniaturized while providing the pressing mechanism that presses the vibrator onto the friction member and the mechanism that is provided to be movable in the pressing direction without any backlash in the driving direction.

In this embodiment, the coupling member 116 is arranged between the pressing springs 111 in the directions parallel to the x-axis and the y-axis, but may be arranged between the pressing springs 111 only in the direction parallel to the x-axis, or may be arranged between the pressing springs 111 only in the direction parallel to the y-axis. With any structure, an effect of miniaturization can be obtained.

Second Embodiment

Figure 7:
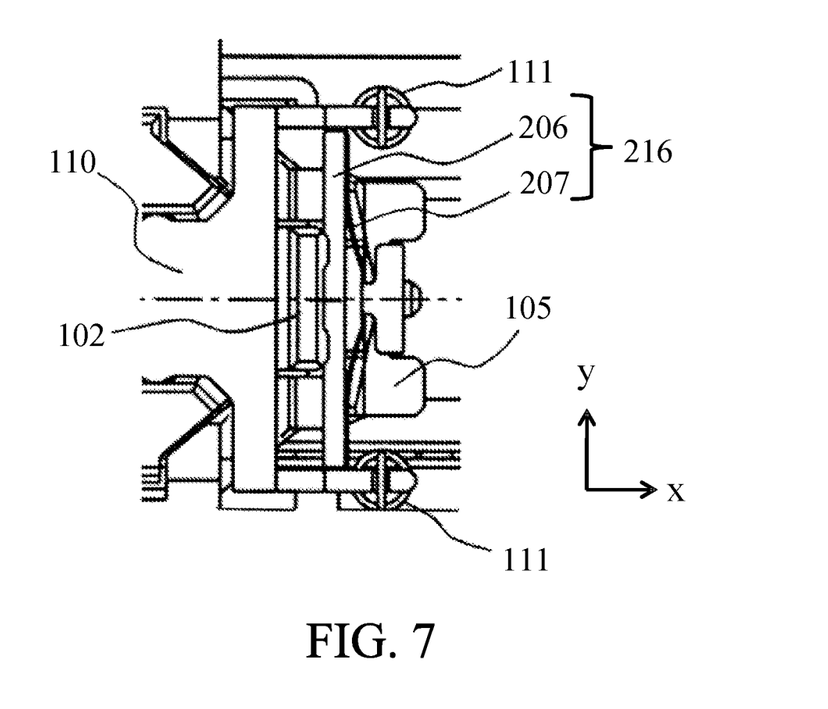
FIG. 7 is an enlarged view of main components of an ultrasonic motor according to a second embodiment.

FIG. 7 is an enlarged view of main components of an ultrasonic motor 1 according to this embodiment. In this embodiment, the same members as the first embodiment are designated by the same reference numerals, and members different from that in the first embodiment are respectively designated by new reference numerals.

A coupling member 216 includes a roller (rolling member) 206 and a plate spring (urging member) 207. The roller 206 has a length in the direction parallel to the y-axis (longitudinal direction) longer than that of the roller 106a in the first embodiment. The plate spring 207, which urges the roller 206, has a length in the direction parallel to the y-axis (longitudinal direction) longer than that of the plate spring 107 in the first embodiment. Lengthening the length in the longitudinal direction of the plate spring 207 can reduce a difficulty level of design of the plate spring 207.

Furthermore, the coupling member 216, which includes the roller 206 and the plate spring 207, contacts with the pressing force transmission member 110 in the direction parallel to the y-axis (longitudinal direction). That is, the holding housing 105 positions the coupling member 116 in the longitudinal direction in the first embodiment, but the pressing force transmission member 110 positions the coupling member 216 in the longitudinal direction in this embodiment.

In each embodiment, the ultrasonic motor 1 has the structure that the vibrator 100 moves and the friction member 104 does not move, but may have the structure that the vibrator 100 does not move and the friction member 104 moves.

In addition, the ultrasonic motor 1 includes the friction member 104 as the fixed member that does not move, but may not include the friction member 104 in the case where the vibrator 100 comes into frictional contact with the member other than the ultrasonic motor 1 (for example, part of the lens holding frame).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-090705, filed on Apr. 28, 2016, which is hereby incorporated by reference herein in its entirety.

What is claimed is:

1. A motor comprising:
a vibrator;
a plurality of pressing members that presses the vibrator onto a contacting member in contact with the vibrator;
a transmission member that transmits pressing force, which is applied by the plurality of pressing members, to the vibrator;
a first holding member that holds the vibrator;
a second holding member that holds the transmission member; and
a coupling member that couples the first holding member to the second holding member;
wherein the vibrator and the contacting member move relatively by vibrations that occur in the vibrator,
wherein the vibrator includes a protruding part that is provided on a surface opposite to a surface on a transmission member side,
wherein the plurality of pressing members is arranged separately to surround the protruding part, and
wherein the coupling member is arranged at a position closer to the protruding part than the plurality of pressing members in at least one direction of a relative movement direction of the vibrator and the contacting member or a direction orthogonal to both of a pressing direction and the relative movement direction.

2. The motor according to claim 1, wherein the coupling member is arranged at a position closer to the protruding part than the plurality of pressing members in the relative movement direction of the vibrator and the contacting member, and in direction orthogonal to both of the relative movement direction and the pressing direction.

3. The motor according to claim 1, wherein the coupling member includes a rolling member that relatively moves the first and second holding members in the pressing direction of the plurality of pressing members, and an urging member that urges the first and second holding members in a direction parallel to a relative movement direction of the vibrator and the contacting member.

4. The motor according to claim 1, wherein the vibrator includes a vibration plate that contacts the contacting member, and a piezoelectric element that excites ultrasonic vibration by being applied with a voltage.

5. An electronic apparatus comprising a motor,
wherein the motor includes:
a vibrator;
a plurality of pressing members that presses the vibrator onto a contacting member in contact with the vibrator;
a transmission member that transmits pressing force, which is applied by the plurality of pressing members, to the vibrator;
a first holding member that holds the vibrator;
a second holding member that holds the transmission member; and
a coupling member that couples the first holding member to the second holding member;
wherein the vibrator and the contacting member move relatively by vibrations that occur in the vibrator,
wherein the vibrator includes a protruding part that is provided on a surface opposite to a surface on a transmission member side,
wherein the plurality of pressing members is arranged separately to surround the protruding part, and
wherein the coupling member is arranged at a position closer to the protruding part than the plurality of pressing members in at least one direction of a relative movement direction of the vibrator and the contacting member or a direction orthogonal to both of a pressing direction and the relative movement direction.

6. A motor that enables a vibrator and a contacting member in contact with the vibrator to move relatively by vibrating the vibrator, the motor comprising:
a pressing mechanism that includes a plurality of elastic members and a transmission member transmitting force by the plurality of elastic members to the vibrator, and that presses the vibrator onto the contacting member;
a first member that holds the vibrator;
a second member that is different from the first member; and
a coupling member that couples the first holding member to the second holding member, so as to enable the first and second members to relatively move in a pressing direction of the pressing mechanism,
wherein the plurality of elastic members is arranged around the vibrator in a plane orthogonal to the pressing direction, and
wherein the coupling member is arranged at a position closer to the vibrator than the plurality of elastic members in at least one direction of a relative movement direction of the vibrator and the contacting member or a direction orthogonal to both of the pressing direction and the relative movement direction.

7. The motor according to claim 6, wherein the plurality of elastic members is arranged to surround the vibrator in the plane orthogonal to the pressing direction.

8. The motor according to claim 6, wherein the transmission member includes a protruding part that is provided to overlap with the vibrator in the pressing direction, and a plurality of holding members that extends in the relative movement direction compared to the protruding part and that respectively holds each of the plurality of elastic members.

9. The motor according to claim 8,
wherein the plurality of elastic members is tension springs,
wherein the pressing mechanism includes spring holding members that respectively hold a first end of each of the tension springs, and wherein the plurality of holding members respectively holds a second end of each of the tension springs.

10. The motor according to claim 6, wherein the coupling member includes a first rolling member and a second rolling member as the rolling member, and
wherein the first and second rolling members are arranged to sandwich the vibrator in the relative movement direction.

11. The motor according to claim 10, wherein the coupling member includes an urging member that urges either of the first or second rolling member in the relative movement direction.

12. The motor according to claim 11, wherein the either of the first or second rolling member, which is urged by the urging member, is larger than the other, which is not urged by the urging member.

13. The motor according to claim 10, wherein the first and second rolling members are arranged so that each rotation axis is orthogonal to both of the relative movement direction and the pressing direction.

14. The motor according to claim 6, wherein the vibrator includes a vibration plate that contacts the contacting member, and a piezoelectric element that excites ultrasonic vibration by being applied with a voltage.

15. An electronic apparatus comprising a motor that enables a vibrator and a contacting member in contact with the vibrator to move relatively by vibrating the vibrator, wherein the motor includes:
a pressing mechanism that includes a plurality of elastic members and a transmission member transmitting force by the plurality of elastic members to the vibrator, and that presses the vibrator onto the contacting member,
a first member that holds the vibrator;
a second member that is different from the first member; and
a coupling member that couples the first holding member to the second holding member, so as to enable the first and second members to relatively move in a pressing direction of the pressing mechanism,
wherein the plurality of elastic members is arranged around the vibrator in a plane orthogonal to the pressing direction, and
wherein the coupling member is arranged at a position closer to the vibrator than the plurality of elastic members in at least one direction of a relative movement direction of the vibrator and the contacting member or a direction orthogonal to both of the pressing direction and the relative movement direction.

16. The motor according to claim 1, wherein the coupling member relatively moves the first and second holding members in the pressing direction.

17. The motor according to claim 6, wherein the pressing mechanism includes a member coupled to the plurality of elastic members and fixed to the second member.

18. The electronic apparatus according to claim 5, further comprising:
a lens that moves in parallel with an optical axis of the lens or in a direction orthogonal to the optical axis by a relative movement of the vibrator and the contacting member.

19. The electronic apparatus according to claim 15, further comprising:
a lens that moves in parallel with an optical axis of the lens or in a direction orthogonal to the optical axis by a relative movement of the vibrator and the contacting member.

* * * * *